United States Patent [19]

Sugano et al.

[11] Patent Number: 5,010,788
[45] Date of Patent: Apr. 30, 1991

[54] AUTOMATIC AUTOMOTIVE TRANSMISSION HAVING 4-2 DOWNSHIFT SEQUENCE VALVE

[75] Inventors: Kazuhiko Sugano, Yokohama; Akihiro Ueki, Zama, both of Japan

[73] Assignee: Nissan Motor Co., Ltd., Yokohama, Japan

[21] Appl. No.: 505,265

[22] Filed: Apr. 6, 1990

[30] Foreign Application Priority Data

Apr. 17, 1989 [JP] Japan .................................. 1-95236

[51] Int. Cl.⁵ .............................................. B60K 41/06
[52] U.S. Cl. ...................................... 74/868; 74/869; 74/870
[58] Field of Search .................. 74/867, 868, 869, 870

[56] References Cited

U.S. PATENT DOCUMENTS

| | | | |
|---|---|---|---|
| 3,142,999 | 8/1964 | Searles et al. | 74/868 |
| 4,455,892 | 6/1984 | Sakakibara | 74/867 |
| 4,680,992 | 7/1987 | Hayasaki et al. | 74/869 |
| 4,730,521 | 3/1988 | Hayasaki et al. | 74/867 |
| 4,831,900 | 5/1989 | Yamamoto et al. | 74/867 |
| 4,951,528 | 8/1990 | Ueki et al. | 74/868 |

FOREIGN PATENT DOCUMENTS 62-62047 3/1987 Japan .

*Primary Examiner*—Dwight Diehl
*Assistant Examiner*—William O. Trousdell
*Attorney, Agent, or Firm*—Foley & Lardner

[57] ABSTRACT

During D-RANGE operation under which a 4-2 downshift is required, a 4-2 downshift sequence valve is responsive to the pressure which is supplied to a friction element which is involved with the production of 3rd gear, and is maintained in a position wherein the 4th speed apply chamber of a band brake servo is maintained pressurized, until such time as the pressure in the 3rd speed friction element drops below a predetermined limit.

When a manual valve is moved out of the D-RANGE position to one wherein engine braking is required, a control pressure is applied to the 4-2 sequence valve which immediately switches it to a position wherein it drains the 4th speed apply chamber irrespective of the 3rd speed pressure. At the same time an overrunning clutch control valve is supplied with the same control pressure and is moved to a position wherein an overrunning clutch is supplied with line pressure and engaged to enable engine braking.

3 Claims, 6 Drawing Sheets

FIG.3

| | | R/C | H/C | F/C | O/C | B/B 2A | B/B 3R | B/B 4A | L&R/B | F/O | L/O | GEAR RATIO | $\alpha_1 = 0.45$ $\alpha_2 = 0.45$ |
|---|---|---|---|---|---|---|---|---|---|---|---|---|---|
| D RANGE | 1ST | | | ○ | | | | | | ○ | ○ | $\dfrac{1+\alpha_1}{\alpha_1}$ | 3.22 |
| ENGINE DRIVING | 2ND | | | ○ | | ○ | | | | ○ | | $\dfrac{\alpha_1+\alpha_2+\alpha_1\alpha_2}{\alpha_1(1+\alpha_2)}$ | 1.69 |
| | 3RD | | ○ | ○ | | | ○ | | | ○ | | 1 | 1 |
| | 4TH | | ○ | (○) | | | | ○ | | | ○ | $\dfrac{1}{1+\alpha_2}$ | 0.69 |
| 2ND RANGE | 1ST | | | ○ | | | ○ | | | ○ | | | |
| | 2ND | | | ○ | | ○ | | | | ○ | | | |
| 1ST RANGE | 1ST | | | ○ | | | | | ○ | ○ | | | |
| REVERSE | | ○ | | | | | | | ○ | | | $-\dfrac{1}{\alpha_2}$ | -2.22 |

( ) UNRELATED TO POWER TRANSMISSION

AUTOMATIC AUTOMOTIVE TRANSMISSION HAVING 4-2 DOWNSHIFT SEQUENCE VALVE

BACKGROUND OF THE INVENTION

1. Field of the invention

The present invention relates to an automotive transmission and more specifically to a transmission equipped with a 4-2 sequence valve which enables a 4-2 shift to assuredly take place in D-RANGE and which is responsive to a manual downshift command in a manner which ensures that the transmission is conditioned to produce second speed immediately before engine braking is enabled and thus avoid transmission interlock.

2. Description of the Prior Art

JP-A-62-62047 discloses a transmission arrangement which includes a 4-2 sequence valve. This valve is arranged to permit a 4-2 shift to directly take place in D-RANGE operation without the transmission being conditioned to produce 3rd speed. The valve is arranged such that in both 3rd and 4th speeds it acts as a switching valve which is responsive to the hydraulic pressure which is used to induce said speeds, in a manner which controls the draining of the servo chamber associated with the production of 4th speed.

In the case that a 4-2 shift is being executed, while the pressure which is supplied to the servo chamber which is associated with the production of 3rd speed, is above a predetermined level, the sequence valve does not switch states and the supply of line pressure to the servo chamber associated with the production of 4th speed is maintained thus maintaining 4th speed. Upon the pressure in the 3rd speed servo chamber dropping to the above mentioned low level, the sequence valve switches and assumes a condition wherein a drain port through which the pressure in 4th speed servo chamber can be exhausted.

However, this arrangement has suffered from the drawback wherein during a manually induced 4-2 downshift there is a delay before engine braking is rendered possible. That is to say, with the above type of transmission control arrangement engine braking wherein torque can be transmitted from the transmission output shaft back through the transmission to the engine, it is necessary to induce engagement of an overrunning clutch. In fact it is preferable to engage the overrunning clutch immediately following the gear selection which requires engine braking.

However, if the overrunning clutch and the band brake which is operated by the 4th speed servo are engaged simultaneously, a partial transmission interlock tends to occur and results in the generation of a substantial shift shock. Accordingly, it is necessary to delay the engagement of the overrunning clutch until such time as the 3rd speed pressure lowers sufficiently and the 4-2 sequence valve permits the pressure which maintains 4the speed to be drained. However, this results in the actual engagement of the overrunning clutch and the conditioning of the transmission to produce engine braking being undesirably delayed following the manual selection.

SUMMARY OF THE INVENTION

It is an object of the present invention to provide a sequence valve arrangement for the above type of transmission control system which prevents transmission interlock and enables engine braking with the minimum of delay following a select which demands the same.

In brief, the above object is achieved by an arrangement wherein during D-RANGE operation under which a 4-2 downshift is required, a 4-2 downshift sequence valve is responsive to the pressure which is supplied to a friction element which is involved with the production of 3rd gear, and is maintained in a position wherein the 4th speed apply chamber of a band brake servo is maintained pressurized, until such time as the pressure in the 3rd speed friction element drops below a predetermined limit.

When a manual valve is moved out of the D-RANGE position to one wherein engine braking is required, a control pressure is issued by the manual valve and applied to the 4-2 sequence valve in a manner which immediately switches it to a position wherein it drains the 4th speed apply chamber irrespective of the 3rd speed pressure. At the same time an overrunning clutch control valve is supplied with the same control pressure and is moved to a position wherein an overrunning clutch is supplied with line pressure and engaged to enable engine braking.

More specifically, in accordance with a first aspect of the present invention a transmission has a first chamber means which is associated with the production of a first predetermined gear ratio, a second chamber means which is associated with the production of a second predetermined gear ratio which is one gear ratio lower than the first predetermined one, and a third chamber means for conditioning a first friction element to assume a condition wherein the transmission can produce engine braking, when supplied with hydraulic pressure; the transmission featuring: a friction element control valve for supplying hydraulic pressure to the third chamber means in response to a hydraulic pressure signal which is produced by a manual valve when the manual valve is set in a first predetermined position; and a sequence valve which, in the absence of the hydraulic pressure signal, enables a shift which skips over a gear intermediate of the gear from which the shift is being made, and the gear to which is being made, the sequence valve being responsive, in the absence of the hydraulic pressure signal, to the pressure which is supplied to the second chamber means associated with the intermediate gear and arranged such that, when the pressure which is supplied to the second chamber means is below a predetermined level, the sequence valve shifts from a first state wherein pressure is supplied to the first chamber means, to a second state wherein the pressure which is supplied to the first chamber means is drained, the sequence valve being responsive to the presence of the hydraulic pressure signal to shift from the first state to the second state irrespective of the pressure being supplied to the second chamber means.

In accordance with a second aspect of the present invention a transmission control arrangement features: an input shaft, an output shaft and a gear train operatively connecting the input and output shafts; a first chamber means for conditioning the gear train to produce a first predetermined gear ratio, when supplied with hydraulic pressure; a second chamber means for conditioning the gear train to produce a second predetermined gear ratio which is one gear ratio lower than the first predetermined one, when supplied with hydraulic pressure; and a third chamber means for conditioning the gear train of the transmission to assume a condition wherein torque can be transmitted from the output shaft back through the gear train to the input shaft in a manner such that engine braking can be produced, when supplied with hydraulic pressure; a friction element control valve for supplying hydraulic pressure to the third chamber means in response to a hydraulic pressure signal which is produced by a manual valve when set in a first predetermined position; and a sequence valve which, in the absence of the hydraulic pressure signal, enables a shift which skips over a gear intermediate of the gear from which the shift is being made, and the gear to which is being made, the sequence valve being responsive, in the absence of the hydraulic pressure signal, to the pressure which is supplied to the second chamber means associated with the intermediate gear and arranged such that, when the pressure which is supplied to the second chamber means is below a predetermined level, the sequence valve shifts from a first state wherein pressure is supplied to the first chamber means, to a second state wherein the pressure which is supplied to the first chamber means is drained, the sequence valve being responsive to the presence of the hydraulic pressure signal to shift from the first state to the second state irrespective of the level of the pressure being supplied to the second chamber means.

In accordance with a third aspect of the present invention a transmission control arrangement features: a gear train operatively arranged between input and output shafts; a first chamber means for conditioning the gear train to produce a first predetermined gear ratio, when supplied with hydraulic pressure; a second chamber means for conditioning the gear train to produce a second predetermined gear ratio which is one gear ratio lower than the first predetermined one, when supplied with hydraulic pressure; a third chamber means for conditioning the gear train of the transmission to assume a condition wherein torque can be transmitted from the output shaft back through the gear train to the input shaft in a manner such that engine braking can be produced, when supplied with hydraulic pressure; a friction element control valve for supplying hydraulic pressure to the third chamber means in response to a hydraulic pressure signal which is produced by a manual valve when set in a first predetermined position; a shift valve, the shift valve being arranged to supply hydraulic fluid to the first chamber means through a first port when in an upshift position, the shift valve having a second port which is communicated with the first port when the shift valve assumes a downshift position; and -a sequence valve, the sequence valve having a drain port and a third port which is in communication with the second port of the shift valve, the sequence valve having a valve element which cuts off communication between the drain port and the third port when in a first position and establishes communication between the third port and the drain port when in a second position, the sequence valve having spring which biases the valve element toward the second position, the sequence valve having a first control chamber in communication with the second chamber means and a second control chamber which fluidly communicates with the manual valve and arranged to receive hydraulic pressure when the manual valve is set in the first predetermined position, the first control chamber being arranged to produce a bias which acts against the bias produced by the spring, the sequence valve being arranged to shift to the second position when hydraulic pressure is supplied into the second control chamber irrespective of the pressure in the first control chamber.

BRIEF DESCRIPTION OF THE DRAWINGS

FIG. 3 is a table showing the relationships between the engagement of the friction elements which control the gear train shown in FIG. 2 and the gear ratios which are produced.

DETAILED DESCRIPTION OF THE PREFERRED EMBODIMENTS

Figure 2:
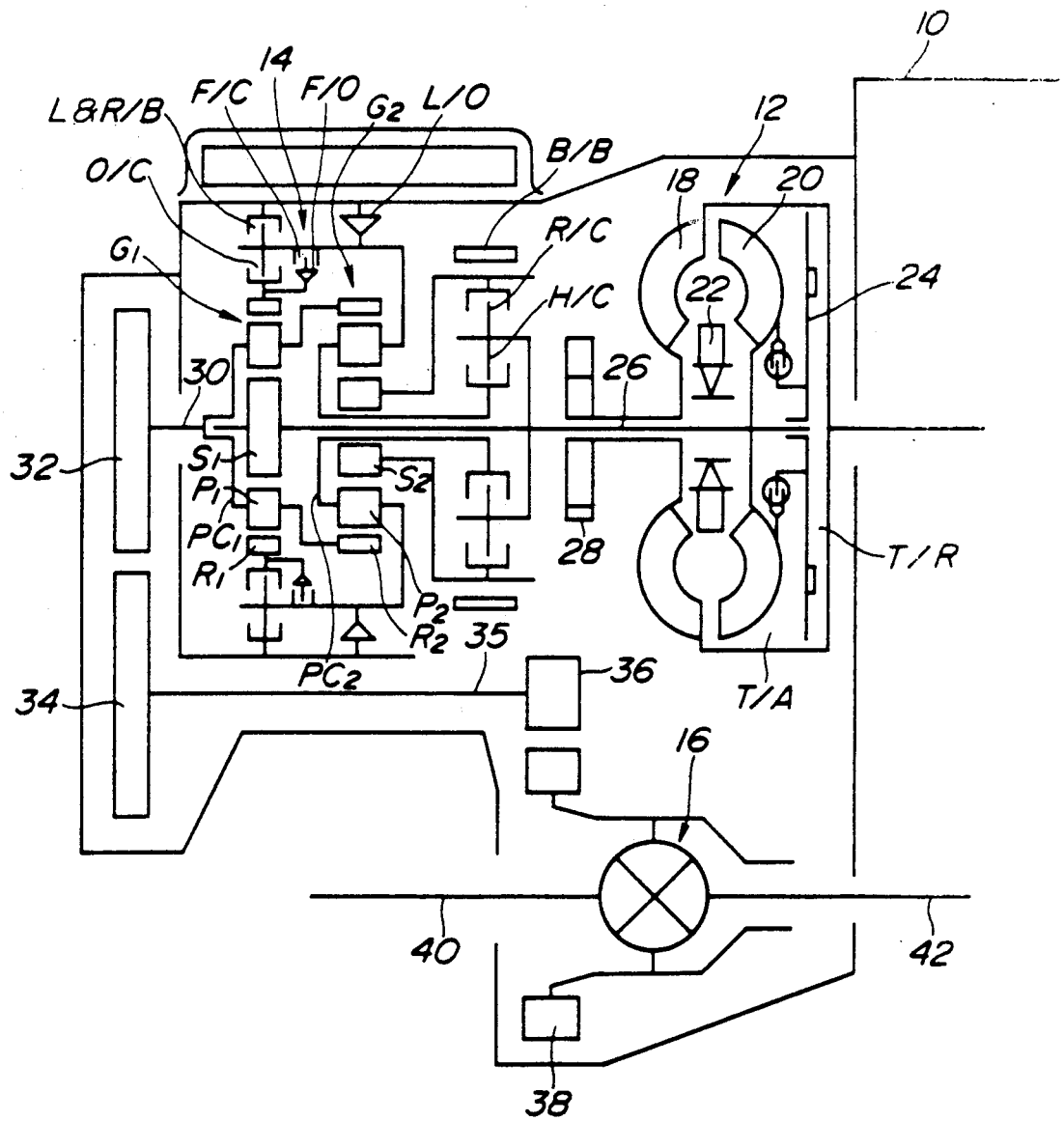
FIG. 2 is a schematic elevation of a transaxle to which the the present invention is applicable.

FIG. 2 schematically shows a transaxle to which the present invention is applied. In this arrangement the transaxle is operatively connected to engine 10 by way of a torque converter 12.

A planetary gear train 14 is operatively arranged between the torque converter 12 and a differential or final drive unit 16.

The torque converter comprises a pump impeller 18, a turbine runner 20, a stator 22 and a lock-up clutch 24. The turbine runner is 20 is connected with the transmission input shaft 26. When the lock-up clutch 24 is released, torque is transmitted via the pump impeller 18 to the input shaft 26. The engagement of the lock-up clutch is determined by the pressure differential existing between an apply chamber T/A and a release chamber T/R.

In this arrangement the oil pump 28 is operatively connected with the torque converter in a manner to be driven by the rotation of the pump impeller 18.

The planetary gear train 14 includes first and second planetary gear sets G1, G2. The first gear set G1 comprises sun, ring pinion gears S1, R1 and P1 while the second gear set G2 comprises sun ring and pinion gears S2, R2 and P2. The pinion gears P1 and P2 are respectively carried on pinion carriers PC1 and PC2.

The sun gear S1 of the first planetary gear set is connected with the input shaft 26 so as to undergo synchronous rotation therewith. The pinion carrier PC1 and the ring gear R2 of the second planetary gears set G2 are connected with a transmission output shaft 30. The ring gear R1 is selectively connectable with the carrier PC2 by way of a forward one-way clutch F/O and the overrunning clutch O/C. Sun gear S2 is selectively connectable with the input shaft 26 by way of a reverse clutch R/C. The pinion carrier PC2 is arranged to connectable with the input shaft 26 by way of a high clutch H/C.

Sun gear S2 can be selectively held stationary by the application of a band brake B/B while the pinion carrier PC2 is operatively connected with parallel low one-way clutch L/O and the low and reverse brake L&R/B in manner which permits said carrier to be selectively held stationary.

An output gear 32 is fixed to one end of the output shaft 30 and arranged to mesh with an idler gear 34. The latter mentioned gear is fixed to one end of the an idler shaft 35 which extends parallel to the input shaft 26 and passes back through the transmission in the direction of the engine.

A reduction gear 36 is provide on the engine end of the idler shaft 35. This gear meshes with ring gear 38 of the differential gear 16.

Torque is delivered to the wheels of the vehicle by way of stub shafts 40, 42. In this instance the stub shafts are connected to the front wheels of the vehicle.

With the above described arrangement, selective engagement and/or use of the clutches F/C, H/C, O/C, R/C and brakes F/O & L/O, it is possible to condition the first and second planetary gear sets G1 and G2 to produce four forward speeds and one reverse. The relationship between the various engagements and the gears produce, is shown in FIG. 3.

It should be noted that, in this chart the circles denote the engagement of an element and/or the use of a one-way clutch. Bracketed circles denote elements which are engaged and/or in use, but which are not actively involved in transmitting torque.

In this transmission band brake B/B has a second speed apply chamber 2A, a third speed release chamber 3R and a fourth speed apply chamber 4A. In FIG. 3 the smaller diameter circles denote chambers of the band brake servo which are supplied with hydraulic fluid.

Further, œ 1 and œ 2 indicate the ratios of the teeth on the ring gears R1, R2 and the corresponding sun gears S1, S2. The gear ratios which are shown are those defined by the rotational speeds of the input and output shafts 26, 30.

With the above described arrangement rotational power or torque is transferred via the gear train from the input shaft to the output shaft 30 and to the final drive or differential gear 16.

In fourth speed an overdrive condition is produced.

Figure 4A:
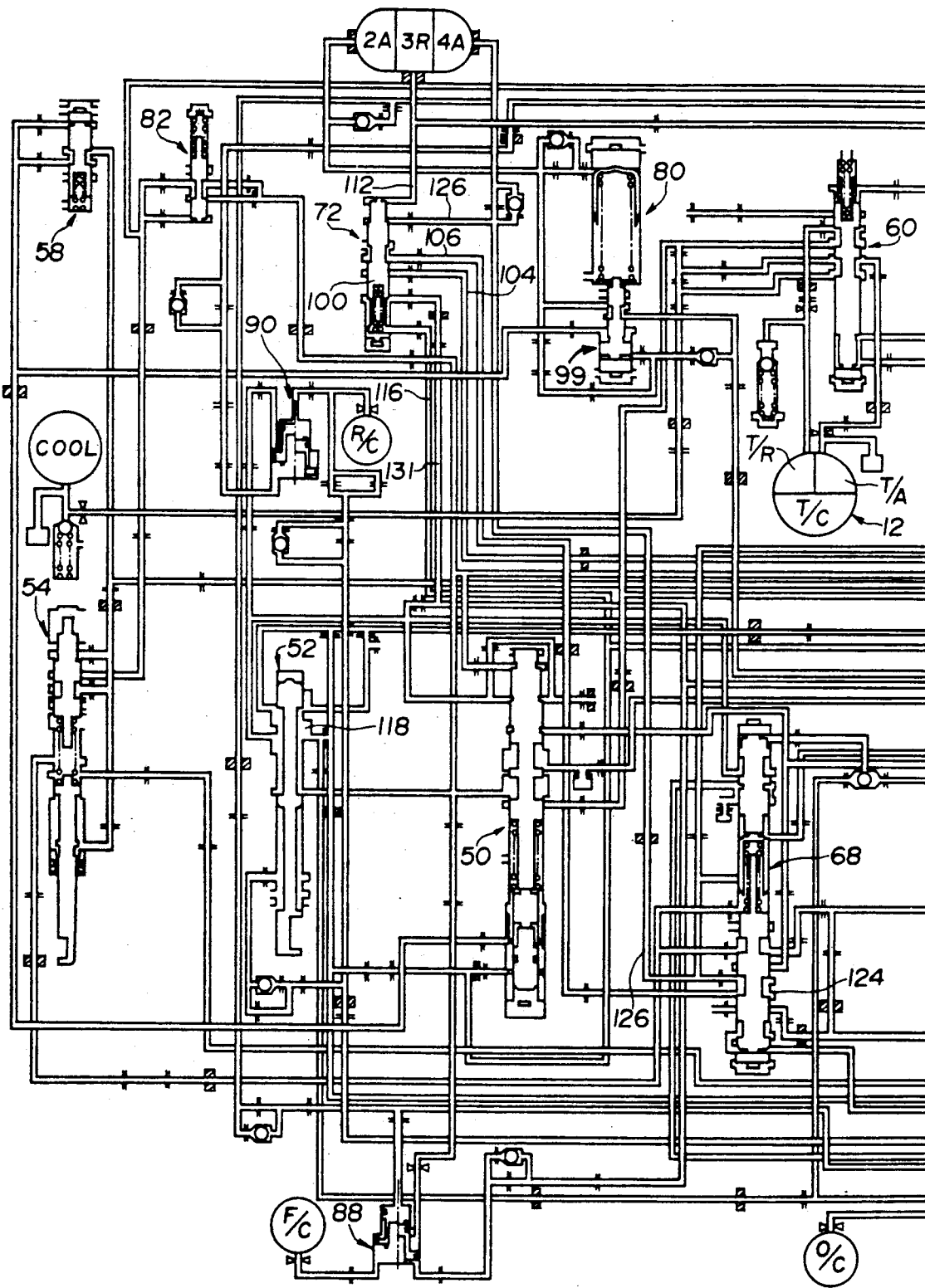
FIGS. 4A and 4B show a friction element control circuit which includes the 4-2 sequence valve showing in FIG. 1.
Figure 4B:
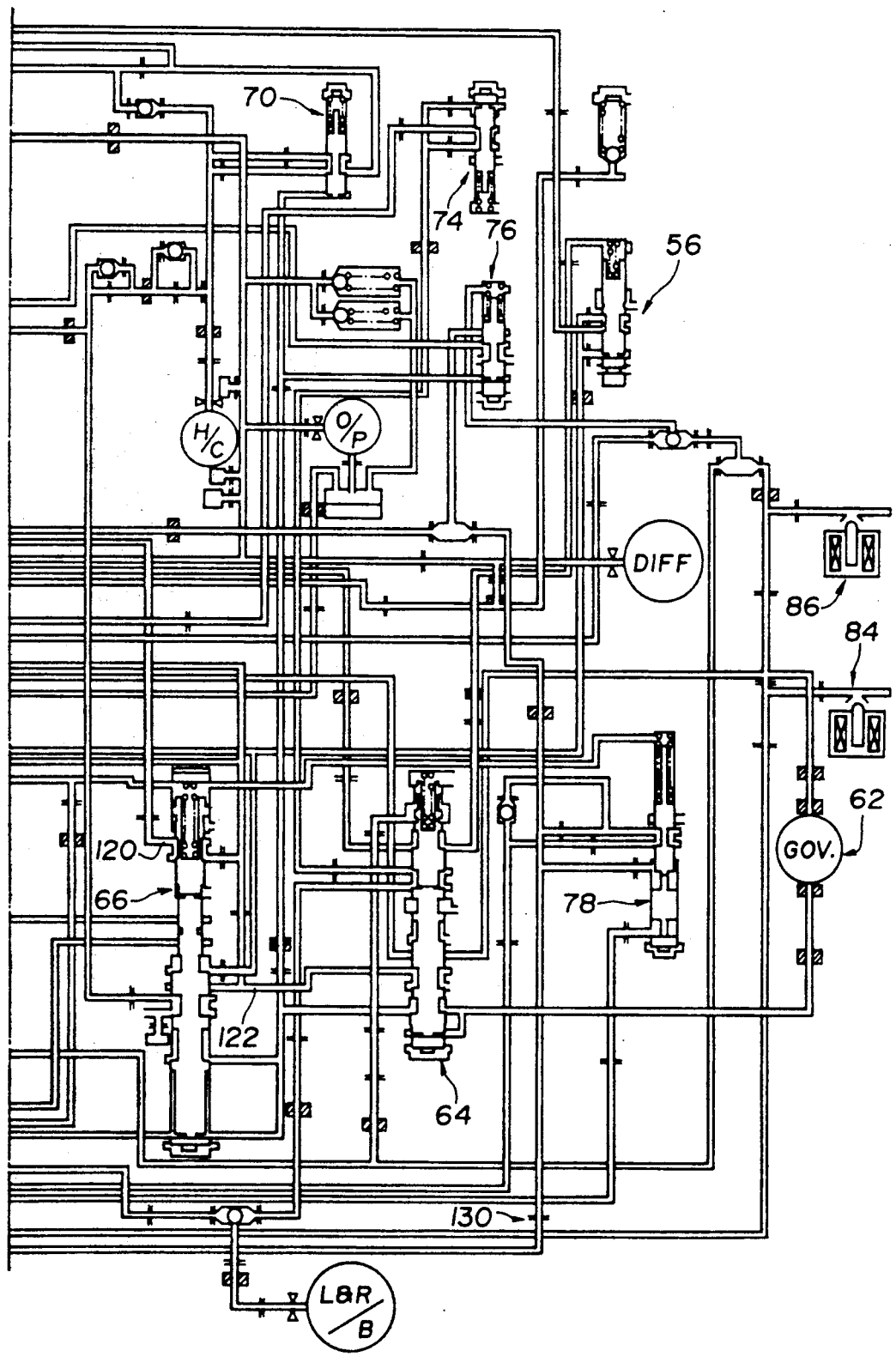

In order to control the above described gear train and produce the engagements shown in FIG. 3, a spool valve control system of the nature illustrated in FIG. 4a & 4b is used.

This system includes a pressure regulator valve 50, a manual valve 52, a throttle valve 54, a throttle modifier valve 56, a pressure modifier valve 58, a lock-up control valve 60, a governor valve 62, a 1-2 shift valve 64, a 2-3 shift valve 66, a 3-4 shift timing valve 70, a 4-2 sequence valve 72, a fixed first speed pressure reducing valve 74, a speed cut-back valve 76, an overrunning clutch control valve 78, a 1-2 accumulator valve 80, a lock-up solenoid 86, a N-D accumulator 88, and a servo release accumulator 90 and a back-pressure control valve 99.

The above listed valves are connected with the oil pump O/P, the torque converter 12, the lock-up apply and release chambers T/A, T/R, the clutches R/C, H/C, O/C and F/C, the brakes L and R/B and B/B are interconnected by a conduit arrangement in the manner illustrated in FIG. 4a and 4b.

The above type of transmission is disclosed in U.S. Pat. No. 4,730,521 filed on Mar. 15, 1988 in the name of Hayasaki et al. The contents of this document are hereby incorporated by reference.

Figure 1:
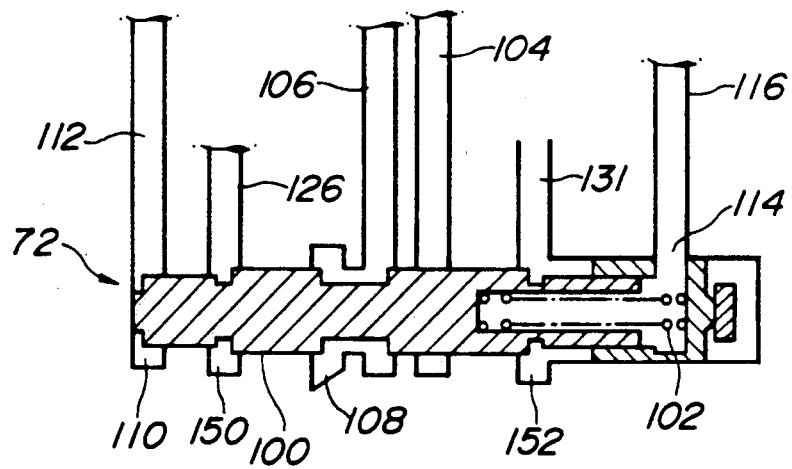
FIG. 1 is a sectional view of a 4-2 sequence valve according to the present invention.

The sequence valve which characterizes the present invention is shown in FIG. 1. This valve comprises a spool 100 which is reciprocatively disposed in a valve bore and a spring 102 which is disposed in the valve bore and arranged to biasingly engage one end of the spool.

Depending on the position of the spool 100 it is possible for conduits 104 and 106 to be placed in fluid communication with one another, or for conduit 104 to be blocked and conduit 106 placed in communication with drain 108. The spring 102 is arranged to urge the spool against bias produced by the pressure which is admitted into the valve bore via port 110 and which acts on the left hand end of the spool (as seen in the drawings). Port 110 is fluidly communicated with conduit 112.

A port 114 is fluidly communicated with a conduit 116 and arranged to introduce hydraulic fluid into the valve bore in a manner to produce a bias which acts on the spool and which urges the spool in the same direction as the spring 102.

A port 150 is fluidly communicated with conduit 126, while a port 152 is fluidly communicated with a conduit 131. The pressures which are admitted to the port via the ports 150 and 152 are arranged to act on pressure differential areas and to produce biases which act in mutually opposed directions (viz., act against one another).

Conduit 112 fluidly communicates with the high clutch H/C and the third speed release chamber 3R and is supplied with line pressure during 3rd and 4th speeds.

Conduit 116 is connected with port 118 of the manual valve 52 and arranged to receive line pressure when the manual valve is set in 2-RANGE Conduit 104 is fluidly communicated with port 120 of the 2-3 shift valve and arranged to be supplied with line pressure when the shift valve has assumed a downshift position and simultaneously the 1-2 shift valve has assumed an upshift position.

Conduit 106 is connected with the port 124 of the 3-4 shift valve 68 in a manner wherein when the 3-4 shift valve assumes an downshift position it is connected with conduit 126. When the 3-4 shift valve assumes an upshift position port 124 is blocked.

Conduit 131 is supplied with line pressure when the manual valve is set in D-RANGE.

OPERATION 4-2 DOWNSHIFT IN D-RANGE

When the manual valve is set in D-RANGE line pressure is supplied into conduit 116. Under these conditions the spool 100 of the sequence valve 72 is switched under the control of the pressures which are supplied to ports 110, 150 and 152. In 4th speed the 2-3 and 3-4 shift valves 68, 66 both assume their respective upshift positions and line pressure is supplied into conduit 112. At the same time, conduits 126 and 131 are also supplied with line pressure. Accordingly, the 4-2 sequence valve 72 is subject to conditions which induce the spool 100 to move to the right from the position shown in FIG. 1 against the bias of the spring 102 to a position wherein the drain 108 is closed and communication between conduits 104 and 106 is established.

In this state, given that the amount of depression of the accelerator pedal (viz., engine load as indicated by the throttle pressure produced by the throttle valve 54) and the vehicle speed as indicated by the governor pressure produced by the governor valve 62, as such as to indicate the need for a 4-2 downshift, both of the 3-4 and the 2-3 shift valves are induced to assume their respective downshift positions. In accordance with this, a reduction in the pressure which has been supplied to the high clutch H/C and the band brake third speed release chamber 3R is induced.

Until the pressure prevailing in conduit 112 reduces to a predetermined level, the spool 100 is maintained in the above mentioned position and the communication between conduits 104 and 106 is maintained. Further, as the 3-4 shift valve has assumed a downshift position, communication between conduits 106 and 126 is established. As a result, hydraulic fluid is supplied from conduit 104 to conduit 106 via the sequence valve 72, and via conduit 106, the 3-4 shift valve 68 and conduit 126 to the 4th speed apply chamber 4A of the band brake B/B. Accordingly, engagement of the band brake B/B is maintained and even though both of the 3-4 and 2-3 shift valves have assumed their respective downshift positions, 4th speed is maintained. Under these conditions (viz., while 4th speed is being maintained), the pressure prevailing in the third speed release chamber 3R and the high clutch H/C are allowed to reduce until the above mentioned predetermined limit is reached. At this time the spool 100 of the 4-2 sequence valve is permitted to return to the position shown in FIG. 1.

With the spool 100 in the position illustrated in FIG. 1 conduit 106 is communicated with drain 108. As a result the pressure prevailing apply chamber 4A of the B/B servo is suddenly drained at the time the pressure in the third speed release chamber 3R has reduced to a low level and the pressure in the second speed apply chamber 2A is such as to maintain engagement of the band brake B/B. The high clutch H/C assumes a release condition and the transmission is conditioned to produce second speed.

Figure 5:
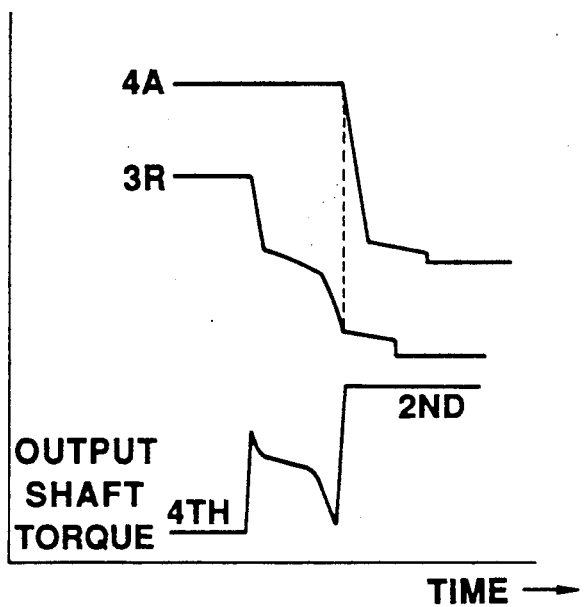
FIGS. 5 and 6 are timing charts which show the pressure and torque output characteristics which characterize automatic and manually induced 4-2 downshifts respectively.

Thus, as will be appreciated, a shift can be made from 4th speed to 2nd without the need to condition the transmission to produce the intermediate 3rd speed. The changes which occur in the hydraulic pressure levels prevailing in the 4A and 3R chambers of the band brake B/B and the attendant changes in the transmission output torque are illustrated in FIG. 5.

MANUAL D-2 RANGE SELECTION

In this case let it be assumed that before the driver manually shifts the transmission control lever (and therefore the manual valve) from the D-RANGE position to the 2-RANGE one, the transmission is conditioned to produce 4th speed - viz., the spool 100 of the 4-2 sequence valve 72 has assumed the position wherein communication between conduits 104 and 106 is established and the 3-4 and 2-3 shift valves are both in their upshift positions. Under these conditions (while the transmission is conditioned to produce 4th speed), the high clutch H/C the 4th speed apply chamber 4A, the third speed release chamber 3R and the second speed apply chamber 2A are all supplied with line pressure.

When the driver manually induces the manual valve to move from the D-RANGE to the 2-RANGE one, line pressure is delivered to port 118 and is transferred via conduit 116 to port 114 of the 4-2 sequence valve 72 and simultaneously to the overrunning clutch control 78. As a result, the spool 100 of the 4-2 sequence valve 72 shifts to the position illustrated in FIG. 1 and conduit 106 is placed in communication with the drain port 108. During 2-RANGE the pressure prevailing in conduit 116 is supplied to the 3-4 and 2-3 shift valves 68, 66 with the result that they are both induced to assume their respective upshift positions.

As a result of this, the pressure prevailing in the 4th speed apply chamber 4A is drained via conduit 126, the 3-4 shift valve 68, conduit 106 and port 108 of the 4-2 sequence valve 72. With this, the pressure prevailing in the 4th speed apply chamber 4A is induced to rapidly reduce. Further, in accordance with the 2-RANGE selection, the pressure which is supplied into conduit 116 induces the overrunning clutch control valve 78 to assume a condition wherein line pressure is supplied to the overrunning clutch O/C. The orifice 130 which delays the rate at which hydraulic fluid is supplied to the overrunning clutch O/C is set to have a relative diameter with the result that line pressure is supplied to the overrunning clutch O/C almost immediately after the 2-RANGE selection and so that engine braking is immediately available.

As indicated above, the pressure in the 4th speed apply chamber 4A is induced to rapidly reduce following a 2-RANGE selection while the pressure which is supplied to the overrunning clutch O/C is permitted to increase. As a result, interlock is avoided while permitting engine braking very shortly after a 2-RANGE selection.

It should be noted that in the above mentioned situation wherein the pressure in the 4th speed apply chamber 4A is induced to drop directly during a 4-2 downshift, the transmission does actually tend to be become conditioned to produce 3rd speed. However, in this instance as the driver is deliberately inducing the downshift, and the time for which third gear is actually engaged as a result of the 2-RANGE selection is very short, no discernable deterioration in the shift feeling is produced.

Figure 6:
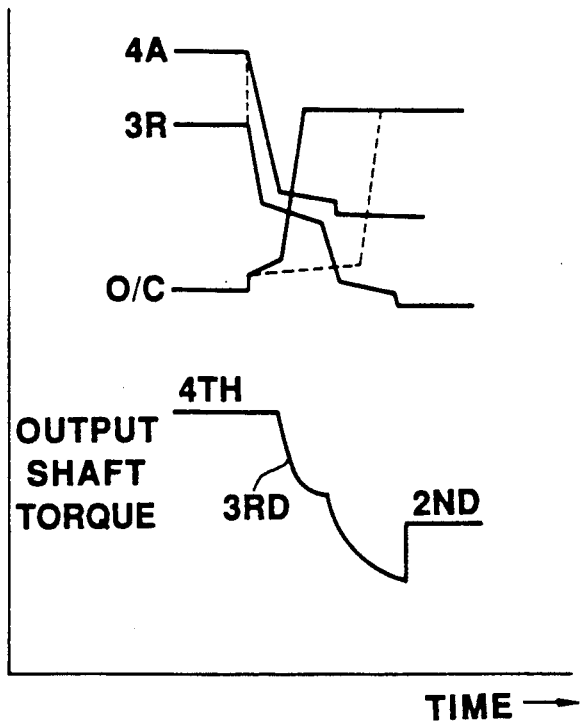

FIG. 6 shows the characteristics with which the pressures in the 4th speed apply chamber 4A, the 3rd speed release chamber 3R and the overrunning clutch change during a manual D-2 RANGE selection. The effect on the torque which is applied to the transmission output shaft is as a result of the engagement of 3rd speed is illustrated in this figure. As mentioned above, this effect is such as to have an essentially negligible effect on the torque transmission and the resulting shift feeling. The broken line trace shows the manner in which the pressure is supplied to the overrunning clutch O/C in accordance with the prior art control arrangements.

It should be noted that the pressure which prevails in the conduit 126 (viz., the pressure which prevails in the 4th speed apply chamber 4A) and which is supplied to port 150 of the 4-2 sequence valve 72 along with the pressure which prevails in conduit 131 and which is supplied to port 152 of said valve, are arranged to act on pressure differential area of the spool 100. However, during a manually induced 4-2 downshift these pressures produce no discernable effect. Ports 150 and 152 are respectively communicate with conduits 126 and 131 and are provided so that during a 3-2 shift the tendency for a 3-4-2 shift to occur is prevented. That is to say, during a 3-2 shift until the spool is moved sufficiently against the bias of the spring 100, there is a brief instant when pressure is supplied to the 4th speed apply chamber 4A. The pressure which is supplied into conduit 126 is such as to alone overcome the force of the spring and move the spool to the right as seen in the drawings.

What is claimed is:
1. In a transmission having:
   a first chamber means which is associated with the production of a first predetermined gear ratio,
   a second chamber means which is associated with the production of a second predetermined gear ratio which is one gear ratio lower than the first predetermined one, and
   a third chamber means for conditioning a first friction element to assume a condition wherein the transmission can produce engine braking, when supplied with hydraulic pressure; an arrangement comprising:
- a friction element control valve for supplying hydraulic pressure to said third chamber means in response to a hydraulic pressure signal which is produced by a manual valve when said manual valve is set in a first predetermined position; and
- a sequence valve which, in the absence of the hydraulic pressure signal, enables a shift which skips over a gear intermediate of the gear from which the shift is being made, and the gear to which is being made, said sequence valve being responsive, in the absence of the hydraulic pressure signal, to the pressure which is supplied to the second chamber means associated with the intermediate gear and arranged such that, when the pressure which is supplied to the second chamber means is below a predetermined level, said sequence valve shifts from a first state wherein pressure is supplied to said first chamber means, to a second state wherein the pressure which is supplied to the first chamber means is drained, said sequence valve being responsive to the presence of said hydraulic pressure signal to shift from the first state to the second state irrespective of the pressure being supplied to the second chamber means.

2. A transmission control arrangement comprising:
- an input shaft, an output shaft and a gear train operatively connecting the input and output shafts;
- a first chamber means for conditioning said gear train to produce a first predetermined gear ratio, when supplied with hydraulic pressure;
- a second chamber means for conditioning said gear train to produce a second predetermined gear ratio which is one gear ratio lower than the first predetermined one, when supplied with hydraulic pressure; and
- a third chamber means for conditioning the gear train of said transmission to assume a condition wherein torque can be transmitted from said output shaft back through said gear train to said input shaft in a manner such that engine braking can be produced, when supplied with hydraulic pressure;
- a friction element control valve for supplying hydraulic pressure to said third chamber means in response to a hydraulic pressure signal which is produced by a manual valve when set in a first predetermined position; and
- a sequence valve which, in the absence of the hydraulic pressure signal, enables a shift which skips over a gear intermediate of the gear from which the shift is being made, and the gear to which is being made, said sequence valve being responsive, in the absence of the hydraulic pressure signal, to the pressure which is supplied to the second chamber means associated with the intermediate gear and arranged such that, when the pressure which is supplied to the second chamber means is below a predetermined level, said sequence valve shifts from a first state wherein pressure is supplied to said first chamber means, to a second state wherein the pressure which is supplied to the first chamber means is drained, said sequence valve being responsive to the presence of said hydraulic pressure signal to shift from the first state to the second state irrespective of the level of the pressure being supplied to the second chamber means.

3. A transmission control arrangement comprising:
- a gear train operatively arranged between input and output shafts;
- a first chamber means for conditioning said gear train to produce a first predetermined gear ratio, when supplied with hydraulic pressure;
- a second chamber means for conditioning said gear train to produce a second predetermined gear ratio which is one gear ratio lower than the first predetermined one, when supplied with hydraulic pressure;
- a third chamber means for conditioning the gear train of said transmission to assume a condition wherein torque can be transmitted from said output shaft back through said gear train to said input shaft in a manner such that engine braking can be produced, when supplied with hydraulic pressure;
- a friction element control valve for supplying hydraulic pressure to said third chamber means in response to a hydraulic pressure signal which is produced by a manual valve when set in a first predetermined position;
- a shift valve, said shift valve being arranged to supply hydraulic fluid to said first chamber means through a first port when in an upshift position, said shift valve having a second port which is communicated with the first port when said shift valve assumes a downshift position; and
- a sequence valve, said sequence valve having a drain port and a third port which is in communication with the second port of said shift valve, said sequence valve having a valve element which cuts off communication between the drain port and the third port when in a first position and establishes communication between the third port and the drain port when in a second position, said sequence valve having spring which biases the valve element toward said second position, said sequence valve having a first control chamber in communication with said second chamber means and a second control chamber which fluidly communicates with the manual valve and arranged to receive hydraulic pressure when the manual valve is set in the first predetermined position, said first control chamber being arranged to produce a bias which acts against the bias produced by the spring, said sequence valve being arranged to shift to said second position when hydraulic pressure is supplied into the second control chamber irrespective of the pressure in the first control chamber.

* * * * *